No. 746,405. Patented December 8, 1903.

UNITED STATES PATENT OFFICE.

KARL THUN, OF ELBERFELD, GERMANY, ASSIGNOR TO FARBENFABRIKEN OF ELBERFELD CO., OF NEW YORK, N. Y., A CORPORATION OF NEW YORK.

PURPURIN-ALPHA-SULFONIC ACID.

SPECIFICATION forming part of Letters Patent No. 746,405, dated December 8, 1903.

Application filed September 2, 1903. Serial No. 171,699. (No specimens.)

*To all whom it may concern:*

Be it known that I, KARL THUN, doctor of philosophy, chemist, (assignor to the FARBENFABRIKEN OF ELBERFELD COMPANY, of New York,) residing at Elberfeld, Germany, have invented a new and useful Improvement in Purpurin-Alpha-Sulfonic Acid; and I hereby declare the following to be a clear and exact description of my invention.

My invention relates to the manufacture of the hitherto-unknown purpurin-alpha-sulfonic acid having either of the following formulæ:

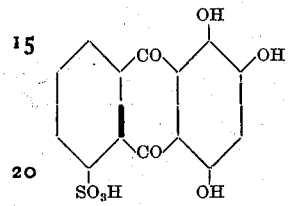 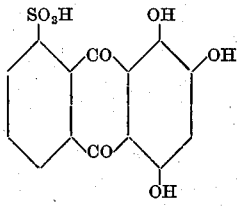

My new process for producing this acid consists in first treating anthraquinone-alpha-sulfonic acid with fuming sulfuric acid of a high percentage of $SO_3$ and then saponifying the sulfuric ester thus produced in the usual manner by heating it with caustic alkalies or with acids, as is described in British Letters Patent No. 12,715, A. D. 1890.

In order to carry out my invention practically, I can proceed as follows, the parts being by weight: A mixture of thirty parts of the potassium salt of anthraquinone-alpha-sulfonic acid and four hundred and fifty parts of fuming sulfuric acid (eighty per cent. of $SO_3$) is heated to 30° centigrade until a saponified test portion shows that the conversion into the purpurin-sulfonic acid has taken place. The melt is then diluted with monohydrated sulfuric acid and introduced into ice-water. From the resulting mixture the sulfuric ester is precipitated in the shape of reddish-yellow flakes by the addition of potassium chlorid. It is soluble in sulfuric acid with a reddish-yellow, in caustic-soda lye with a dull violet-red, and in ammonia with a yellowish-red color. For the conversion of the intermediate product thus produced into the purpurin-alpha-sulfonic acid it is dissolved in a hot solution of potassium hydroxid heated to boiling, and the resulting solution is then decomposed while boiling with an excess of hydrochloric acid, and the sodium salt of the purpurin-alpha-sulfonic acid is precipitated by adding common salt. It is a red powder which dissolves in hot water, producing a yellowish-red solution. It is soluble in caustic-soda lye, ammonia, and a sodium-carbonate solution with a red color and soluble in concentrated sulfuric acid of 66° Baumé with a yellowish-red color which turns violet-red by the addition of boric acid. It dyes alumina-mordanted wool red and chrome-mordanted wool bluish-red shades, which are bluer than the corresponding shades obtained by means of the known purpurin-beta-sulfonic acid.

Having now described my invention and in what manner the same is to be performed, what I claim as new, and desire to secure by Letters Patent, is—

The herein-described new purpurin-alpha-sulfonic acid which in the shape of its sodium salt is a red powder soluble in water producing a yellowish-red solution and soluble in ammonia, caustic-soda lye and a sodium-carbonate solution producing red solutions; being soluble in concentrated sulfuric acid of 66° Baumé with a yellowish-red color turning violet-red by the addition of boric acid; and dyeing alumina-mordanted wool red and chrome-mordanted wool bluish-red shades, substantially as hereinbefore described.

In testimony whereof I have signed my name in the presence of two subscribing witnesses.

KARL THUN.

Witnesses:
OTTO KÖNIG,
J. A. RITTERSHAUS.